US010823230B2

(12) United States Patent
Hochstetler et al.

(10) Patent No.: US 10,823,230 B2
(45) Date of Patent: Nov. 3, 2020

(54) DISCONNECT SHAFT FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 354 days.

(21) Appl. No.: 15/723,455

(22) Filed: Oct. 3, 2017

(65) Prior Publication Data
US 2019/0101162 A1 Apr. 4, 2019

(51) Int. Cl.
F16C 3/02 (2006.01)
F16D 1/04 (2006.01)
F02C 7/32 (2006.01)
F16H 3/72 (2006.01)
H02K 7/18 (2006.01)
F02C 7/36 (2006.01)
F16D 11/14 (2006.01)
F16D 11/04 (2006.01)
(Continued)

(52) U.S. Cl.
CPC ............... F16D 1/04 (2013.01); F02C 7/32 (2013.01); F02C 7/36 (2013.01); F16C 3/02 (2013.01); F16D 11/04 (2013.01); F16D 11/14 (2013.01); F16H 3/728 (2013.01); H02K 7/1807 (2013.01); F16D 2011/008 (2013.01); F16D 2023/123 (2013.01); Y10T 403/7045 (2015.01)

(58) Field of Classification Search
CPC . F16D 1/04; F16D 11/04; F16D 11/14; F16D 2023/123; F16D 2011/008; F02C 7/36; F02C 7/32; H02K 7/1807; F16H 3/728; F16C 3/02; Y10T 403/7045
USPC .............................. 464/38, 39, 183; 403/364
See application file for complete search history.

(56) References Cited

U.S. PATENT DOCUMENTS

| 876,053 A | 1/1908 | Heard |
| 1,193,008 A | 8/1916 | Fuller |
| 4,244,455 A | 1/1981 | Loker |

(Continued)

FOREIGN PATENT DOCUMENTS

| BE | 462337 A | 1/1946 |
| DE | 822178 C | 11/1951 |
| EP | 1449706 A2 | 8/2004 |

OTHER PUBLICATIONS

European Search Report for EP Application No. 18196677.1 dated Jan. 9, 2019.

Primary Examiner — Greg Binda
(74) Attorney, Agent, or Firm — Carlson, Gaskey & Olds, P.C.

(57) ABSTRACT

A disconnect shaft for use in an integrated drive generator longitudinally extending between a first end and a second end having a plurality of gear teeth extending longitudinally from a first face disposed at the first end. A cam ledge is at an intermediate location between the first end and the second end. An annular cavity is defined between an inner surface of an inner bore of the disconnect shaft and an outer surface of a radially inner portion of the disconnect shaft. A generator and a method are also disclosed.

5 Claims, 3 Drawing Sheets

(51) Int. Cl.
*F16D 11/00* (2006.01)
*F16D 23/12* (2006.01)

(56) References Cited

U.S. PATENT DOCUMENTS

| | | | |
|---|---|---|---|
| 4,341,482 A * | 7/1982 | Wollensak | B43K 5/005 403/364 |
| 8,240,449 B2 * | 8/2012 | Shinagawa | F16D 11/14 |
| 9,057,407 B2 * | 6/2015 | Brust | F16D 9/02 |
| 2016/0263987 A1 | 9/2016 | Brownell et al. | |
| 2017/0016489 A1 | 1/2017 | Grosskopf et al. | |
| 2019/0203647 A1 * | 7/2019 | Hochstetler | F02C 7/32 |

\* cited by examiner ered. Electric power

DISCONNECT SHAFT FOR INTEGRATED DRIVE GENERATOR

BACKGROUND OF THE INVENTION

This application relates to a disconnect shaft for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

The disconnect shaft is typically cammed to move axially away from the input shaft. A spring typically biases the disconnect shaft toward the input shaft. The disconnect shaft drives the carrier when in contact with the input shaft. As can be appreciated, the disconnect shaft faces challenges.

SUMMARY OF THE INVENTION

A disconnect shaft for use in an integrated drive generator longitudinally extending between a first end and a second end having a plurality of gear teeth extending longitudinally from a first face disposed at the first end. A cam ledge is at an intermediate location between the first end and the second end. An annular cavity is defined between an inner surface of an inner bore of the disconnect shaft and an outer surface of a radially inner portion of the disconnect shaft.

An integrated drive generator is also disclosed, as is a method of replacing a disconnect shaft in an integrated drive generator.

These and other features may be best understood from the following drawings and specification.

DETAILED DESCRIPTION

Figure 1:
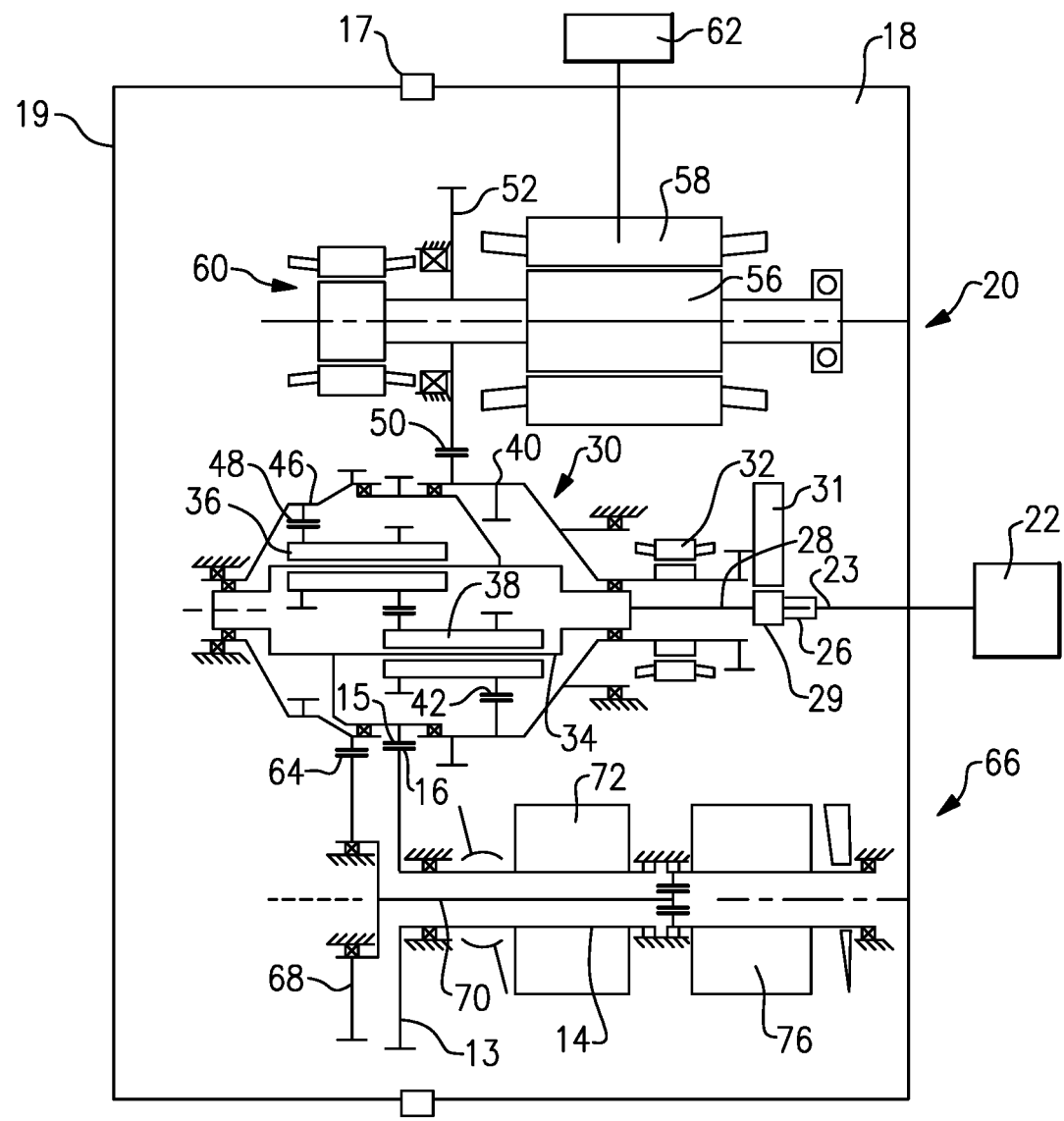
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
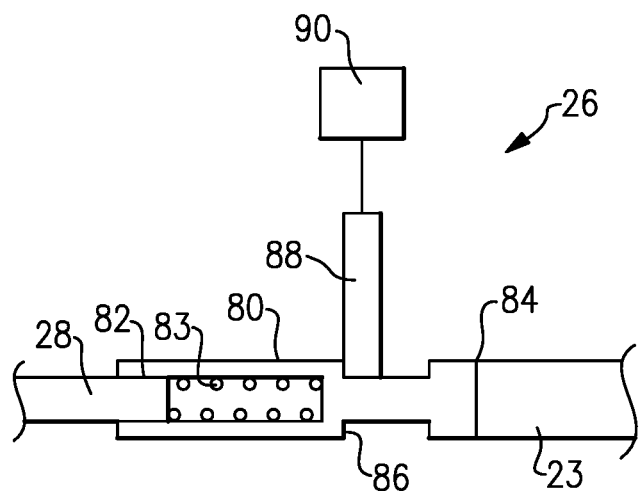
FIG. 2 schematically shows a disconnect assembly.

FIG. 2 schematically shows the disconnect assembly 26. The input shaft 23 contacts a gear interface 84 with a disconnect shaft 80. A spline connection 82 drives the carrier shaft 28. A spring 83 biases the disconnect shaft 80 towards engagement with the input shaft 23. A cam face on a cam ledge 86 on the disconnect shaft 80 receives an actuator 88 under the operation of a control 90. The actuator 88 can provide camming action along the cam face to move the disconnect shaft 80 to the left, in this figure, and against the force of the spring 83 to break the drive connection between the input shaft 23 and the disconnect shaft 80. This basic operation is known in current integrated drive generators.

Figure 3A:
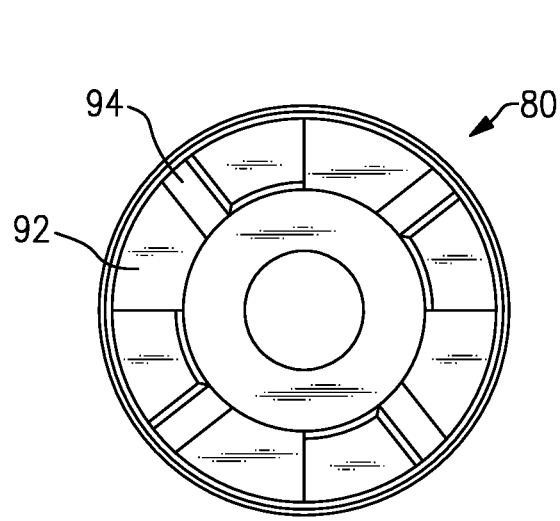
FIG. 3A shows an end view of a disconnect shaft.

FIG. 3A shows a front face of the disconnect shaft 80. A plurality of gear teeth 94 are positioned on a front face 92. There are four teeth in the disclosed embodiment.

Figure 3B:
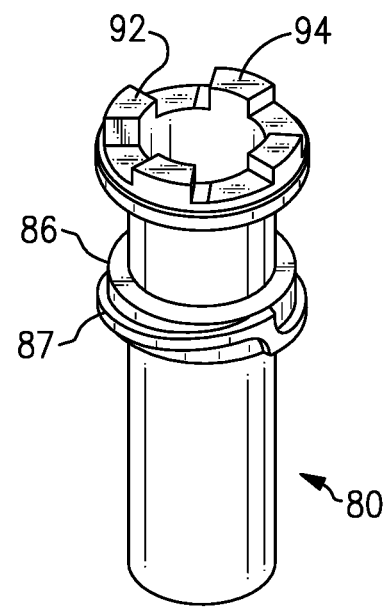
FIG. 3B is a perspective view.

FIG. 3B is a perspective view and shows the disconnect shaft 80, the front face 92, and the teeth 94. Also, a cam face 87 is shown on cam ledge 86.

Figure 4:
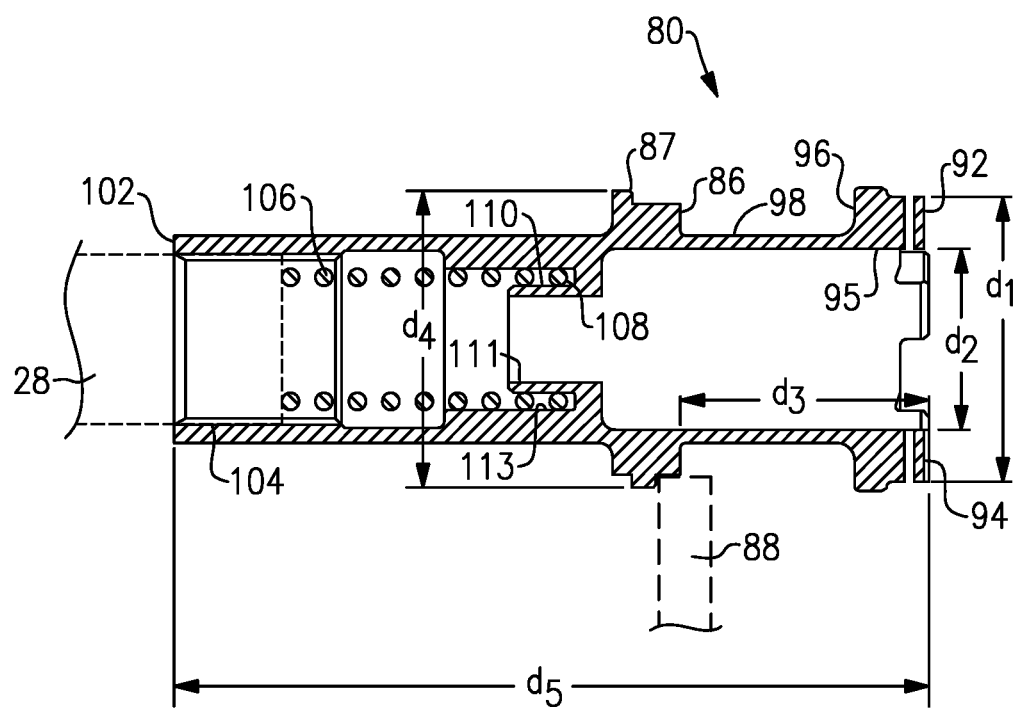
FIG. 4 is a cross-sectional view through the disconnect shaft.

As shown in FIG. 4, the front face 92 of the disconnect shaft 80 is spaced from an end 96 of an enlarged forward portion. A channel 98 is positioned between end 96 and the cam ledge 86.

As shown, the cam face 87 has a changing profile across a circumferential dimension, such that the actuator 88 can cause the disconnect shaft 80 to move to the left against the force of a spring 106. The spring 106 sits between an end face of the carrier shaft 28 and a cavity 110. The carrier shaft 28 rides along spline teeth 104 inside the disconnect shaft to drive the carrier shaft when the disconnect shaft rotates. A rear end 102 of the disconnect shaft is also shown.

Cavity 110 houses the spring 106. In embodiments, the cavity 110 is defined by a radially inner portion 111 spaced inwardly from a radially outer portion 113 and providing cavity 110 to receive a forward end 108 of the spring 106. The cavity 110 provides support for the end of the spring 106. Cavity 110 is shown spaced toward rear end 102 relative to cam ledge 86.

An outer diameter $d_1$ is defined as a diameter to an outer peripheral surface of the front face 92. An inner diameter $d_2$ is defined to a radially inner surface 95 of a bore at the front face 92. A cam ledge distance $d_3$ is defined between the front face 92 and a beginning of the cam ledge 86. A diameter $d_4$ is defined to the outer periphery of the cam surface 87. An overall distance $d_5$ is defined between rear end 102 and front face 92.

In an embodiment, $d_1$ is 1.836 inches (4.784 cm). In a prior art disconnect shaft, it was 1.375 inches.

$d_2$ in one embodiment is 1.230 inches (3.124 cm). In that same prior art embodiment, $d_2$ was 0.5 inches.

In the embodiments, a ratio of $d_1$ to $d_2$ is between 1.4 and 2.1.

In that same prior disconnect shaft, the distance $d_3$ was much smaller with the cam ledge being effectively directly behind the surface 96. In the disclosed embodiment, $d_3$ is 1.607 inches. In the prior embodiment, $d_3$ was 0.257 inch (0.652 cm). In the disclosed embodiment, $d_4$ is 1.930 inches (4.90 cm). In that same prior embodiment, it was 1.5 inches (3.81 cm). In the disclosed embodiment, $d_5$ is 4.896 inches (12.43 cm).

In embodiments, a ratio of $d_3$ to $d_5$ is between 0.25 and 0.45. In the same disclosed embodiments, a ratio of $d_4$ to $d_5$ is between 0.3 and 0.5.

A disconnect shaft, as disclosed here, provides valuable operational benefits.

A method of replacing a disconnect shaft in an integrated drive generator comprising the steps of removing an existing disconnect shaft from an integrated drive generator including a housing enclosing an input shaft. The input shaft has a gear interface with the existing disconnect shaft. The existing disconnect shaft having spline teeth at an inner peripheral bore slideably engaging a carrier shaft and a spring biasing the existing disconnect shaft such that gear teeth on a forward face of the existing disconnect shaft engage the input shaft. An actuator selectively moves the existing disconnect shaft against the spring to move the gear teeth on the existing disconnect shaft out of engagement with the input shaft. The carrier shaft provides a drive input into a gear differential by driving a set of planetary gears to, in turn, drive a ring gear portion. The ring gear portion selectively provides drive input into a main generator.

The method includes the further step of replacing the existing disconnect shaft with a replacement disconnect shaft. The replacement disconnect shaft includes a forward face having a plurality of gear teeth and extending in a direction to a rear end. A cam ledge is at an intermediate location between the forward face and the rear end. There is an inner bore within the disconnect shaft and a cavity in the inner bore receives an end of the spring to bias the replacement disconnect shaft. The cavity is defined by a radially inner portion of the replacement disconnect shaft spaced from a radially outer portion to define the cavity.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A disconnect shaft for use in an integrated drive generator longitudinally extending between a first end and a second end having a plurality of gear teeth extending longitudinally from a first face disposed at the first end, a cam ledge at an intermediate location between said first end and said second end, an annular cavity defined between an inner surface of an inner bore of said disconnect shaft and an outer surface of a radially inner portion of the disconnect shaft; and wherein an outer diameter of said gear teeth is defined at said first end, and an inner diameter is defined to a radially inner surface of a bore at said first face, and a ratio of said outer diameter to said inner diameter being between 1.4 and 2.1.

2. The disconnect shaft as set forth in claim 1, wherein a cam ledge distance is defined between said first face and a beginning point of said cam ledge, and a ratio of said cam ledge distance to an overall distance between said first face and said second end being between 0.25 and 0.45.

3. The disconnect shaft as set forth in claim 2, wherein said cam ledge including a cam face having a cam outer diameter and a ratio of said cam outer diameter to said overall distance being between 0.3 and 0.5.

4. The disconnect shaft as set forth in claim 3, wherein there are four of said gear teeth on said first face.

5. The disconnect shaft as set forth in claim 1, wherein there are four of said gear teeth on said first face.

* * * * *